United States Patent
Cha

(10) Patent No.: US 10,218,440 B2
(45) Date of Patent: Feb. 26, 2019

(54) METHOD FOR VISIBLE LIGHT COMMUNICATION USING DISPLAY COLORS AND PATTERN TYPES OF DISPLAY

(71) Applicant: FOUNDATION FOR RESEARCH AND BUSINESS, SEOUL NATIONAL UNIVERSITY OF SCIENCE AND TECHNOLOGY, Seoul (KR)

(72) Inventor: Jae Sang Cha, Seoul (KR)

(73) Assignee: FOUNDATION FOR RESEARCH AND BUSINESS, SEOUL NATIONAL UNIVERSITY OF SCIENCE AND TECHNOLOGY, Seoul (KR)

(*) Notice: Subject to any disclaimer, the term of this patent is extended or adjusted under 35 U.S.C. 154(b) by 0 days.

(21) Appl. No.: 15/740,327

(22) PCT Filed: Dec. 8, 2016

(86) PCT No.: PCT/KR2016/014391
§ 371 (c)(1),
(2) Date: Mar. 15, 2018

(87) PCT Pub. No.: WO2017/119619
PCT Pub. Date: Jul. 13, 2017

(65) Prior Publication Data
US 2018/0191437 A1 Jul. 5, 2018

(30) Foreign Application Priority Data

Jan. 8, 2016 (KR) .................. 10-2016-0002579
Dec. 8, 2016 (KR) .................. 10-2016-0166696

(51) Int. Cl.
*H04B 10/00* (2013.01)
*H04B 10/116* (2013.01)
(Continued)

(52) U.S. Cl.
CPC ............. *H04B 10/116* (2013.01); *G06K 9/20* (2013.01); *H04B 10/516* (2013.01)

(58) Field of Classification Search
CPC . H04B 10/116; H04B 10/112; H04B 10/1123; H04B 10/114; H04B 10/1141;
(Continued)

(56) References Cited

U.S. PATENT DOCUMENTS

| | | |
|---|---|---|
| 2010/0284697 A1 | 11/2010 | Bae et al. |
| 2013/0308955 A1 | 11/2013 | Walewski |
| 2014/0270796 A1 | 9/2014 | Jovicic et al. |
| 2015/0147067 A1 | 5/2015 | Ryan et al. |
| 2015/0372753 A1* | 12/2015 | Jovicic ................ H04B 10/116 398/172 |

FOREIGN PATENT DOCUMENTS

| | | |
|---|---|---|
| KR | 10-2010-0121400 A | 11/2010 |
| KR | 10-2011-0008459 A | 1/2011 |
| KR | 10-2012-0067268 A | 6/2012 |

OTHER PUBLICATIONS

Lohit Penubaku et al., "An attempt to transfer information using light as a medium and camera receiver", 2015 International Conference on Computing and Network Communications (CoCoNet), Dec. 16-19, 2015, 7 pages.
(Continued)

*Primary Examiner* — Hanh Phan
(74) *Attorney, Agent, or Firm* — Sughrue Mion, PLLC

(57) ABSTRACT

A visible light communication (VLC) method in which a transmission device having a display transmits a signal to a reception device having a camera according to the present invention includes outputting, by the transmission device, a visible light signal including data for transmission (referred to as "transmission data" below) through the display using
(Continued)

at least one of a color and a pattern, and receiving, by the reception device, the visible light signal through the camera and extracting the transmission data.

17 Claims, 20 Drawing Sheets

(51) Int. Cl.
*G06K 9/20* (2006.01)
*H04B 10/516* (2013.01)

(58) Field of Classification Search
CPC ............ H04B 10/1143; H04B 10/1149; H04B 10/516
USPC ....... 398/172, 128, 130, 127, 118, 119, 135, 398/115, 158, 136, 159, 183, 202, 208, 398/192, 193, 194
See application file for complete search history.

(56) References Cited

OTHER PUBLICATIONS

Jaesang Cha et al., "Display Light Pattern based Tx with SCAM", IEEE 802.15-16-0024-03-007a, Jan. 21, 2016, 22 pages.
Jaesang Cha et al., "PHY/MAC Draft D0 Comments Update for Sequential Scalable 2D Code Modulation (Rev2.0)", IEEE P802.15-16-0529-01-007a, Sep. 2016, 21 pages.
Anurag Sarkar et al., "Li-Fi Technology: Data Transmission through Visible Light", International Journal of Advance Research in Computer Science and Management Studies, Jun. 2015, 13 pages, vol. 3, Issue 6.
Korean Office Action issued in KR 10-2016-0002579 dated Sep. 14, 2017.
International Search Report for PCT/KR2016/014391 dated Mar. 15, 2017 [PCT/ISA/210].

\* cited by examiner

METHOD FOR VISIBLE LIGHT COMMUNICATION USING DISPLAY COLORS AND PATTERN TYPES OF DISPLAY

TECHNICAL FIELD

The present invention relates to a visible light communication (VLC) method using a display, and more particularly, to a VLC method in which a display device performs VLC by transmitting a visible light signal to a camera device.

BACKGROUND ART

In VLC, which is one of various wireless communications technologies, a signal is carried by visible light having a wavelength of 380 nm to 780 nm. With the recent development of light-emitting diode (LED) technology, VLC is being continuously developed.

In particular, such VLC technology is being applied to and used in various types of displays, such as signage panels, electronic boards, etc., for emitting visible light as well as lighting fixtures.

For example, various types of information can be provided to a user having a VLC receiver through a display device included in a television (TV), a monitor, a smart device, or the like.

However, according to related art, the visible light communication may be inconvenient for a general user to use because a user who wants to use the visible light communication must purchase a visible light communication receiver separately.

DISCLOSURE

Technical Problem

The present invention is directed to providing a visible light communication (VLC) method in which it is possible to transmit a large amount of information in short time by using at least one of a color and a pattern of visible light output from a display.

However, technical objects of the present embodiments are not limited to the aforementioned technical object, and there can be other technical objects.

Technical Solution

One aspect of the present invention provides a visible light communication (VLC) method in which a transmission device having a display transmits a signal to a reception device having a camera, the method including: outputting, by the transmission device, a visible light signal including data for transmission (referred to as "transmission data" below) through the display by using at least one of a color and a pattern; and receiving, by the reception device, the visible light signal through the camera and extracting the transmission data.

The outputting of the visible light signal through the display may include: changing, by the transmission device, the transmission data into modulated data by using a communication modulation technique; and including, by the transmission device, the modulated data in the visible light signal by using at least one of the color and the pattern, and outputting the visible light signal through the display.

The communication modulation technique may be any one of spread spectrum color shift keying (SS-CSK) modulation, scalable color amplitude modulation (SCAM), spread spectrum scalable color amplitude modulation (SS-SCAM), and variable transparent amplitude shape color (VTASC) modulation.

The extracting of the transmission data may include: receiving, by the reception device, the visible light signal through the camera, and extracting the modulated data; and changing, by the reception device, the modulated data into the transmission data by using a demodulation method corresponding to the communication modulation technique.

The changing of the transmission data into the modulated data by using the communication modulation technique, by the transmission device, may include modulating individual video frames by using different spreading codes according to VTASC modulation.

The changing of the modulated data into the transmission data by using the demodulation method corresponding to the communication modulation technique, by the reception device, may include extracting the modulated data by using a spreading code previously stored in the reception device.

If the receiving device receives the same video frame a plurality of times, the receiving device removes the redundant video frame based on the despreading demodulation technique using the spreading code applied to the received video frame and the next received video frame.

The receiving of the visible light signal through the camera and the extracting of the modulated data by the reception device may include, when an angle between the transmission device and the reception device does not face a forward direction, according to a distortion correction algorithm restoring the transmission data in the transmitting device the modulated data can be extracted.

The receiving of the visible light signal through the camera and the extracting of the modulated data by the reception device may include, when a distance between the transmission device and the reception device is a preset distance or more, calculating the distance from the transmission device based on a size of the pattern of the transmission data, restoring the transmission data based on the calculated distance, and extracting the modulated data.

The including of the modulated data in the visible light signal and the outputting of the visible light signal through the display may include: dividing, by the transmission device, a screen of the display into a plurality of regions; dividing, by the transmission device, the modulated data so that pieces of the divided modulated data correspond to the regions; and outputting, by the transmission device, divided visible light signals including the respective pieces of divided data through the respective regions by using the at least one of the color and the pattern.

The dividing of the screen of the display into the plurality of regions by the transmission device may include: sensing, by the transmission device, a distance from the reception device; and dividing, by the transmission device, the modulated data so that pieces of the divided modulated data correspond to regions, the number of regions being determined according to the distance.

The dividing of the screen of the display into the plurality of regions by the transmission device may include determining a number and an arrangement of the divided regions according to a size and a shape of the screen of the display.

The including of the modulated data in the visible light signal and the outputting of the visible light signal through the display may include: when the transmission device outputs the visible light signal by using the pattern, including the modulated data in the visible light signal by using a color and a size of the pattern, and outputting the visible light signal through the display.

The pattern may have any one shape among a circle, a square, a rectangle, an ellipse, a triangle, and a star.

The pattern may be a sequential scalable two-dimensional (2D) code, and the sequential scalable 2D code may be implemented as at least one of a quick response (QR) code and a color code.

The including of the modulated data in the visible light signal and the outputting of the visible light signal through the display may include: sensing, by the transmission device, a distance from the reception device; dividing, by the transmission device, a screen of the display into a plurality of regions so that the modulated data corresponds to the regions, the number of regions being determined according to the distance; dividing, by the transmission device, the modulated data so that pieces of the divided modulated data correspond to the regions; and outputting, by the transmission device, divided visible light signals including the respective pieces of divided data through the respective regions by using the at least one of the color and the pattern.

The including of the modulated data in the visible light signal and the outputting of the visible light signal through the display may include dividing, by the transmission device, the visible light signal according to a plurality of frame rates (frames per second (fps)), and outputting divided visible light signals.

The including of the modulated data in the visible light signal and the outputting of the visible light signal through the display may include including, by the transmission device, the modulated data in the visible light signal by using a color of an app icon, and outputting the visible light signal through the display.

The transmission device may be any one of a smart phone, a smart watch, a tablet personal computer (PC), a monitor, a television (TV), and an electronic board, and the reception device may be any one of a smart phone, a smart watch, a smart pad, and a tablet PC.

Advantageous Effects

According to any one of the above-described technical solutions of the present invention, since a transmission device includes data to be transmitted in a visible light signal by using at least one of a color and a pattern of a display and transmits the visible light signal to a reception device, the transmission device can rapidly transmit a large amount of data.

In particular, the transmission device can rapidly transmit a larger amount of data by using both a color and a size of the pattern, by dividing the screen of a display into a plurality of regions and transmitting a visible light signal, or by performing visible light transmission with patterns and colors of a plurality of displays of identical or different device types.

In addition, when a user has a reception device with a camera, for example, a smart phone, a smart pad, a smart watch, or the like, it is possible to perform visible light communication (VLC) using the reception device as is. Therefore, a user can easily use VLC without purchasing a VLC receiver.

MODES OF THE INVENTION

Figure 1:
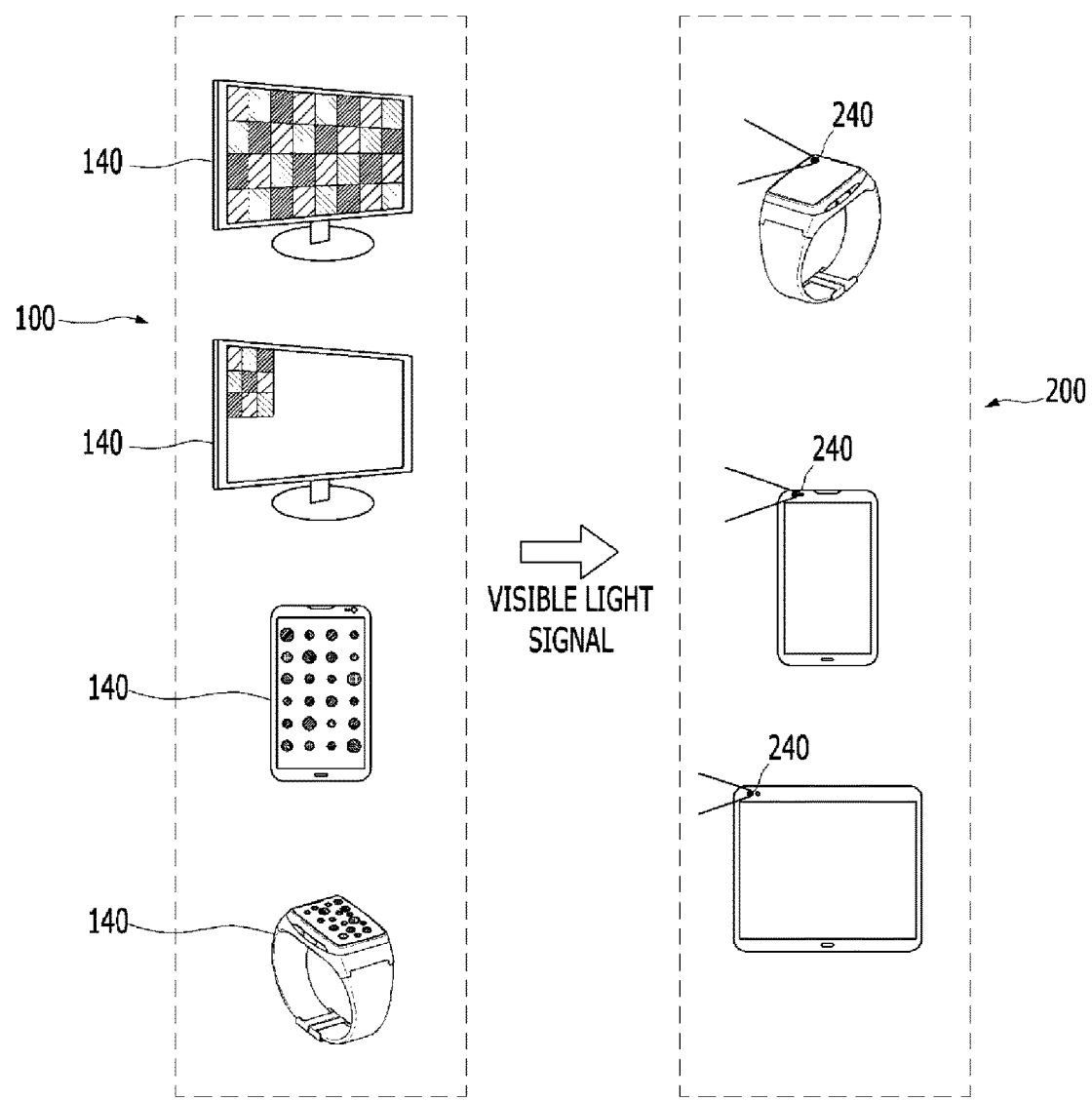
FIG. 1 is a conceptual diagram illustrating a visible light communication (VLC) method according to an embodiment of the present invention.

Hereinafter, embodiments of the present invention will be described in detail with reference to the accompanying drawings so that those of ordinary skill in the art can easily implement the present invention. However, the present invention can be implemented in various different forms and is not limited to embodiments described herein. In the drawings, portions unrelated to the description will be omitted to obviously describe the present invention.

Throughout this specification, when any one part is referred to as "including" an element, it means that other elements are not excluded and may be additionally included unless particularly stated otherwise.

Exemplary embodiments of the present invention will be described in detail below with reference to the accompanying drawings. Meanwhile, different types of hatching shown in drawings of the present invention denote different colors.

Figure 2:
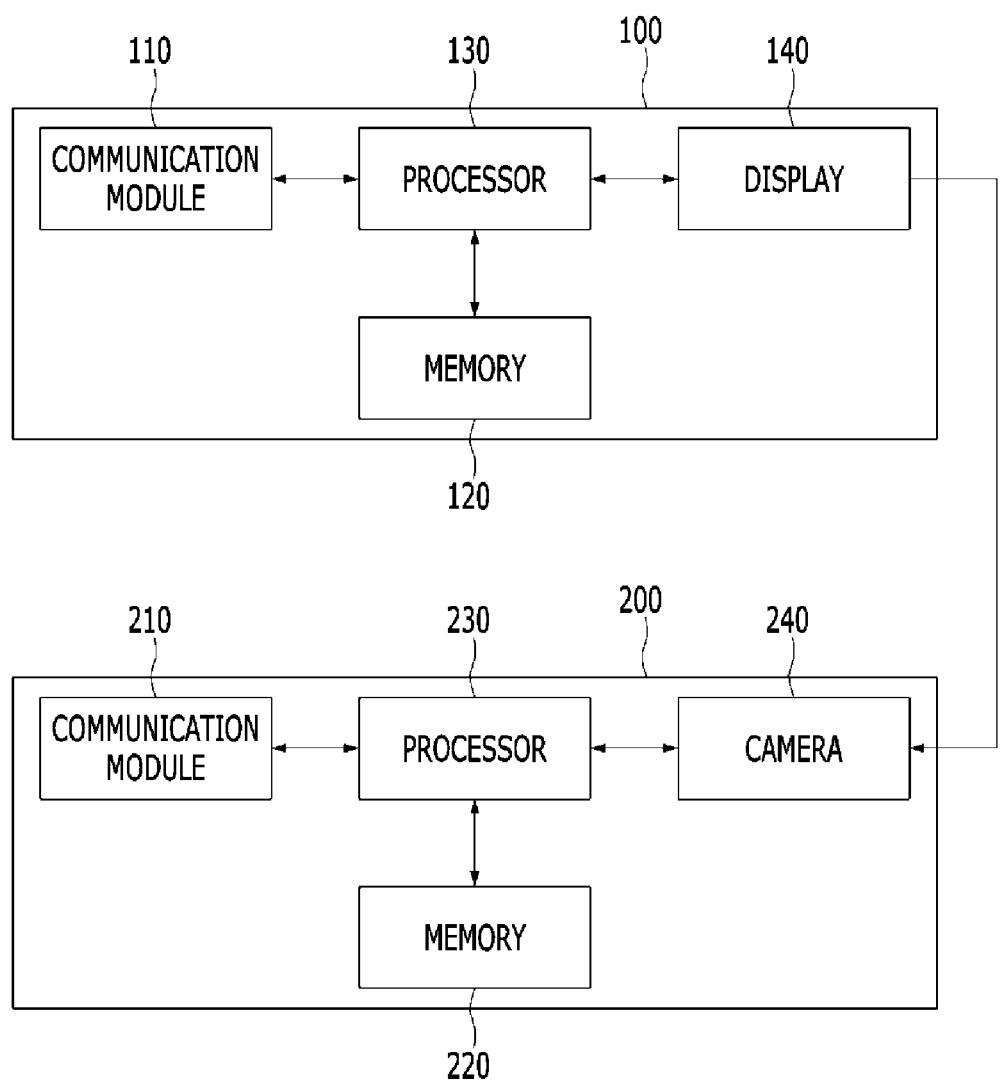
FIG. 2 is a block diagram of a transmission device and a reception device according to an embodiment of the present invention.

FIG. 1 is a conceptual diagram illustrating a visible light communication (VLC) method according to an embodiment of the present invention. FIG. 2 is a block diagram of a transmission device 100 and a reception device 200 according to an embodiment of the present invention.

Referring to FIG. 1, a VLC method according to an embodiment of the present invention is a communication method in which the transmission device 100 having a display 140 transmits a visible light signal to the reception device 200 having a camera 240.

Here, the transmission device 100 is a digital device having the display 140 and can be any one of a smart phone, a smart pad, a smart watch, a tablet personal computer (PC), a monitor, and a television (TV).

Also, the reception device 200 is a digital device having the camera 240 and can be any one of a smart phone, a smart pad, a smart watch, and a tablet PC.

The transmission device 100 and the reception device 200 are not limited to the aforementioned examples and can be various types of devices having the display or the camera 240, such as digital signage including a digital information display and a touchscreen kiosk.

Meanwhile, as shown in FIG. 2, each the transmission device 100 and the reception device 200 can be configured to include a communication module 110 or 210, a memory 120 or 220, a processor 130 or 230, and the display 140 or the camera 240.

The communication modules 110 and 210 are components for transmitting and receiving data according to the VLC method. A program for transmitting data according to the VLC method is stored in the memories 120 and 220. Here, the memories 120 and 220 collectively refer to non-volatile storage devices that continuously maintain stored information without a power supply and to volatile storage devices.

For example, the memories 120 and 220 can include NAND flash memories such as a compact flash (CF) card, a secure digital (SD) card, a memory stick, a solid-state drive (SSD), and a micro SD card, magnetic computer storage devices such as a hard disk drive (HDD), optical disc drives such as a compact disk read-only memory (CD-ROM) and a digital versatile disc (DVD), and the like.

The program stored in the memories 120 and 220 can be implemented in software form or hardware form, such as a field programmable gate array (FPGA) or an application specific integrated circuit (ASIC), and can play predetermined roles.

When the program stored in the memories 120 and 220 is executed, the processors 130 and 230 can modulate transmission data into modulated data and transmit the modulated data through the communication modules 110 and 210, or can acquire transmission data by receiving and demodulating modulated data.

Figure 3:
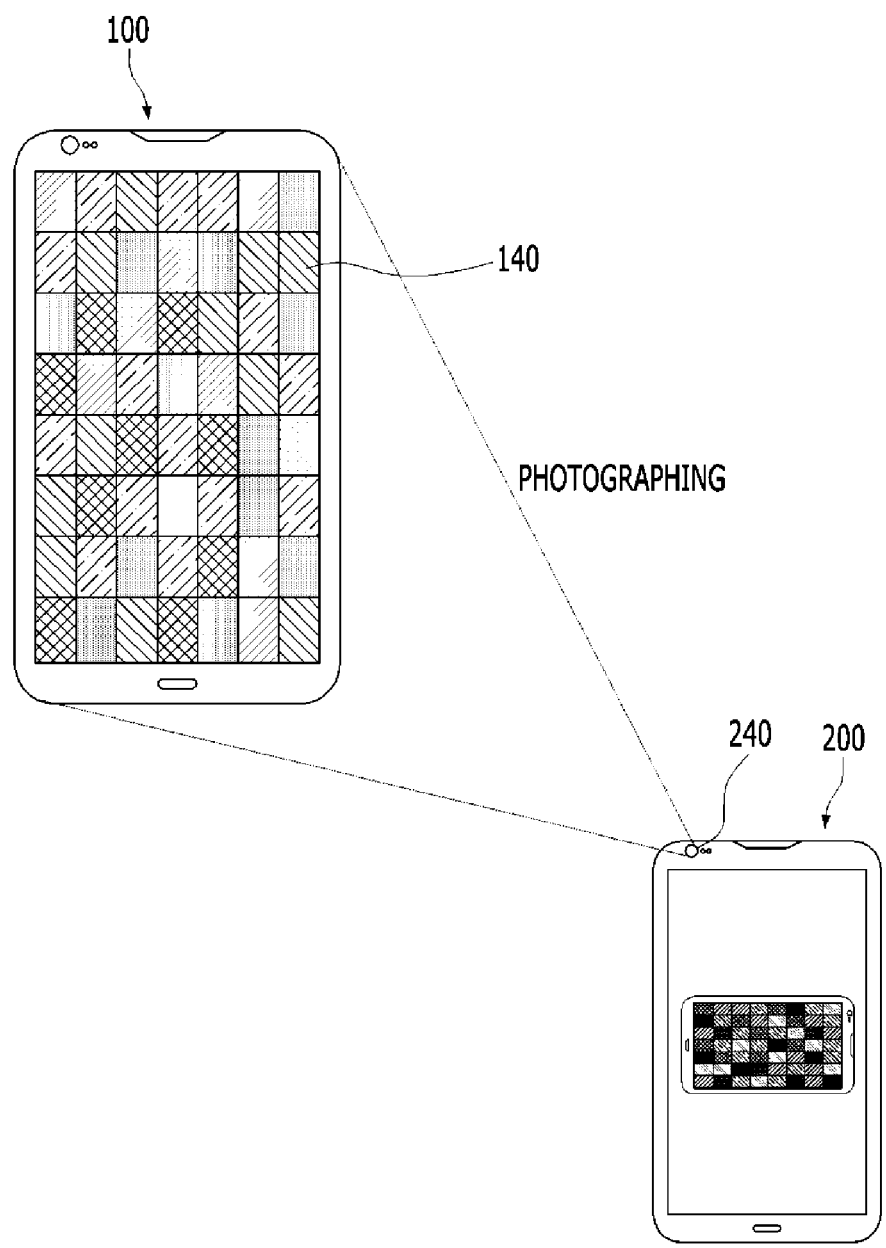
FIG. 3 is a diagram showing an example in which a display-based transmission device of FIG. 1 divides a visible light signal, which employs colors, according to a plurality of regions and transmits the visible light signal, and a reception device receives the visible light signal.

FIG. 3 is a diagram showing an example in which the transmission device 100 of FIG. 1 based on the display 140 divides a visible light signal, which employs colors, according to a plurality of regions and transmits the visible light signal, and the reception device 200 receives the visible light signal.

Referring to FIG. 3, in the VLC method according to an embodiment of the present invention, the transmission device 100 can output a visible light signal including data for transmission (referred to as "transmission data" below) through the display 140 by using at least one of a color and a pattern.

Then, the reception device 200 can receive the visible light signal output from the transmission device 100 by photographing the display 140 of the transmission device 100 by using the camera 240, and extract the transmission data.

Although smart phones are shown in FIG. 3 as examples of the transmission device 100 and the reception device 200, the transmission device 100 and the reception device 200 can be implemented as various devices as described with reference to FIG. 1.

A process in which the transmission device 100 according to an embodiment of the present invention transmits transmission data will be described below with reference to FIGS. 4 to 12.

Figure 4:
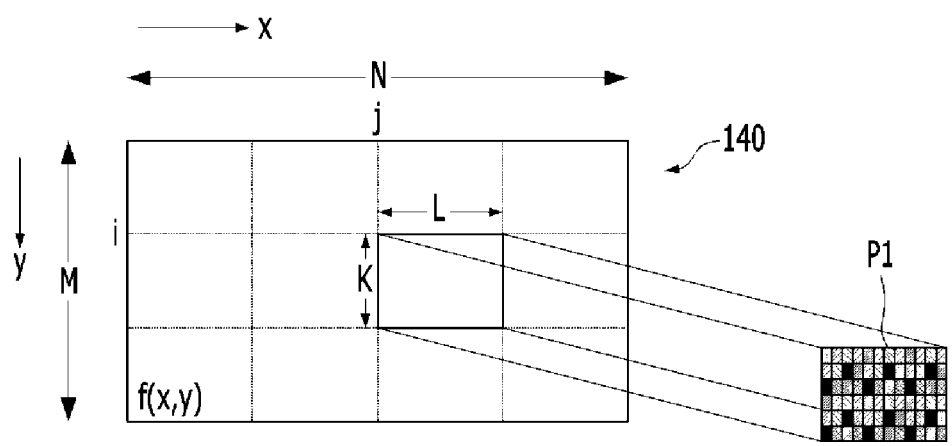
FIG. 4 is a diagram showing a state in which a display screen of the transmission device of FIG. 1 is divided into a plurality of regions.

FIG. 4 is a diagram showing a state in which the screen of the display 140 of the transmission device 100 of FIG. 1 is divided into a plurality of regions.

In the process of including modulated data in a visible light signal and outputting the visible light signal through the display 140, the transmission device 100 according to an embodiment of the present invention can divide the screen of the display 140 into a plurality of regions and output the visible light signal. Here, the plurality of regions can be arranged in a matrix form to correspond to the screen of the display 140 as shown in FIG. 4.

Accordingly, the screen of the display 140 having M×N pixels is divided into a plurality of regions having K×L pixels.

Subsequently, the transmission device 100 divides the modulated data so that pieces of the divided modulated data correspond to the individual regions. Then, the transmission device 100 may output divided visible light signals that include the respective pieces of divided modulated data through the respective regions by using at least one of a color and a pattern.

Here, the transmission device 100 may output the divided modulated data so that only modulated data having one color and pattern is output in each of the plurality of regions, or may output modulated data P1 having a plurality of colors and patterns in one region as shown in FIG. 4.

Figure 5:
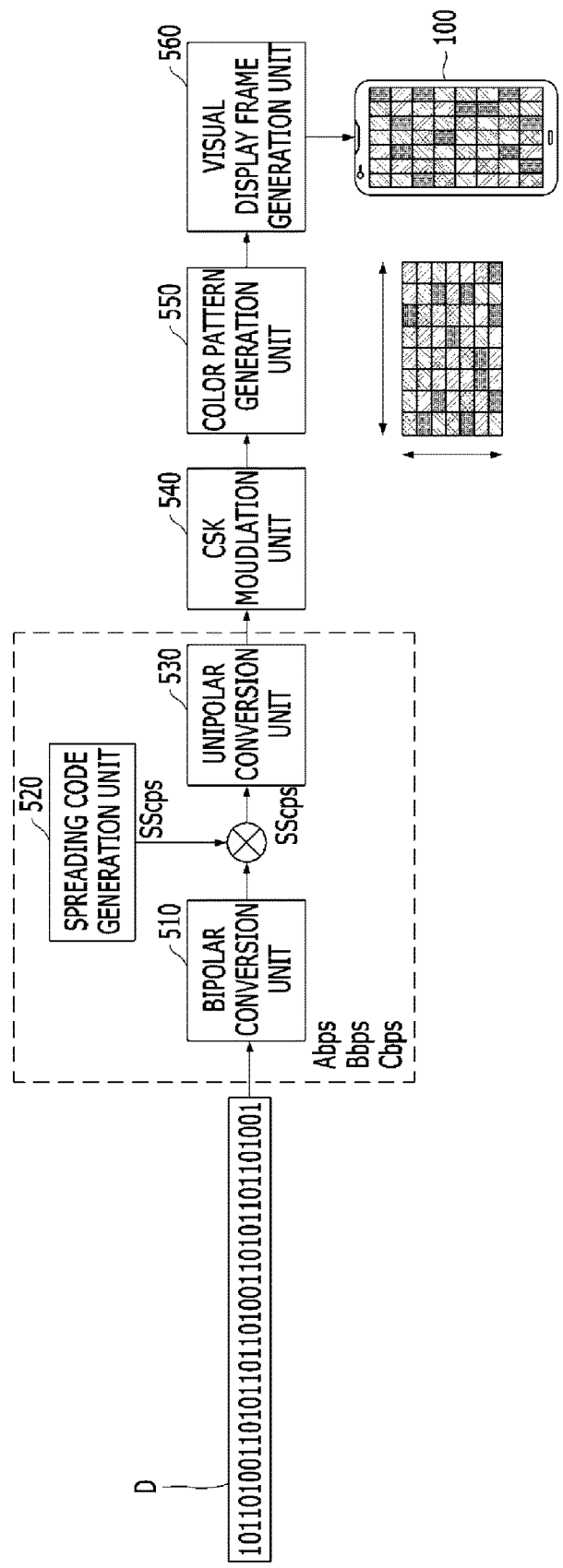
FIG. 5 is a diagram illustrating an example of a process in which the transmission device of FIG. 1 outputs a visible light signal through the display by applying spread spectrum color shift keying (SS-CSK) modulation to data to be transmitted.
Figure 6:
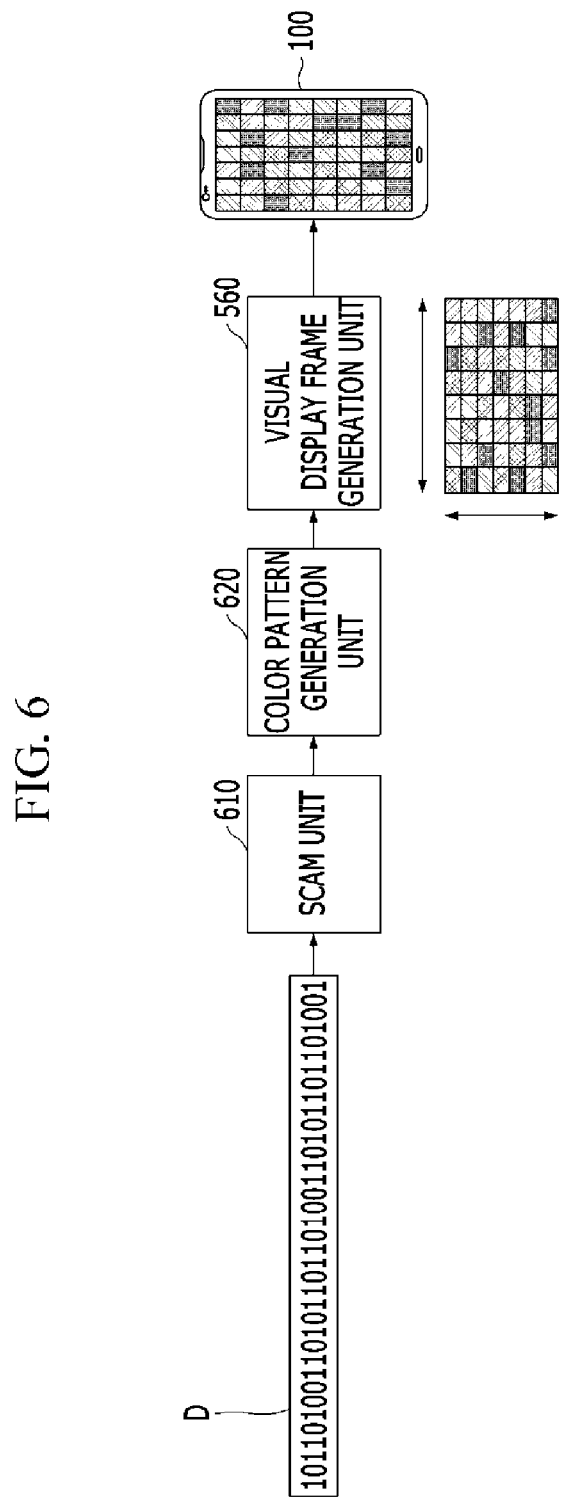
FIG. 6 is a diagram illustrating an example of a process in which the transmission device of FIG. 1 outputs a visible light signal by applying scalable color amplitude modulation (SCAM) to data to be transmitted.
Figure 7:
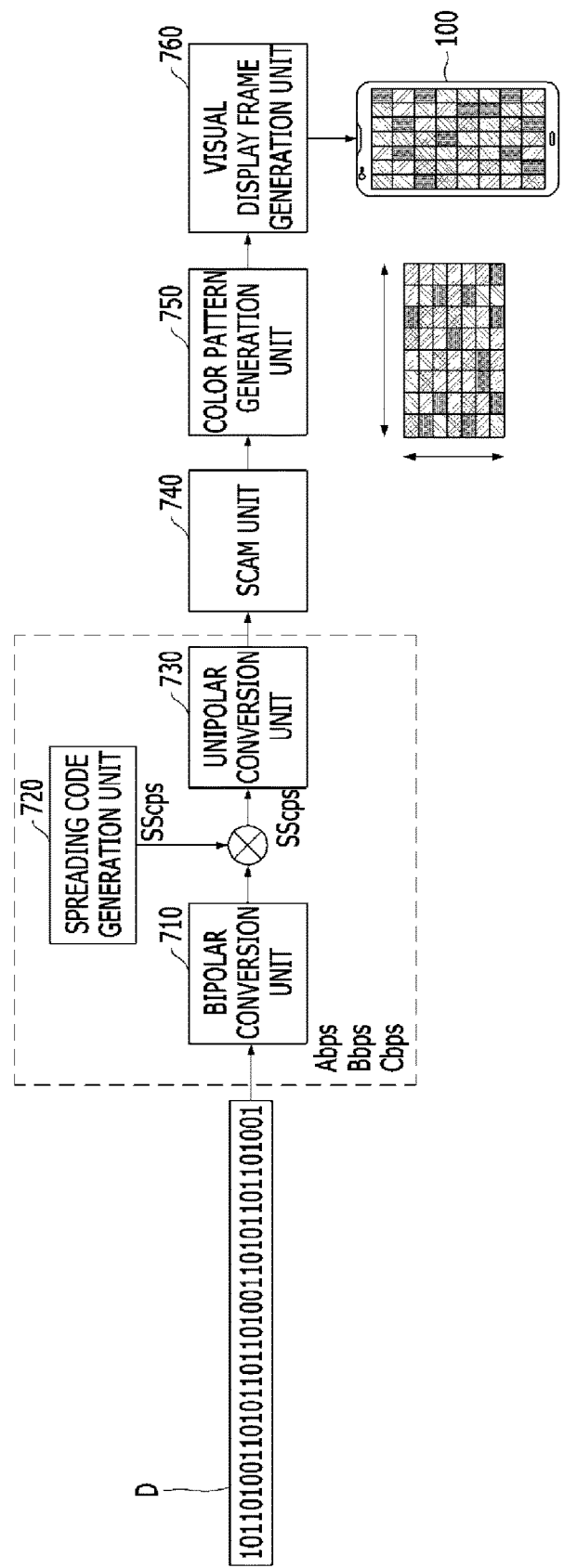
FIG. 7 is a diagram illustrating an example of a process in which the transmission device of FIG. 1 outputs a visible light signal through the display by applying spread spectrum scalable color amplitude modulation (SS-SCAM) to data to be transmitted.

To change transmission data into modulated data as described above, communication modulation techniques depicted in FIGS. 5 to 7 can be used. Here, a communication modulation technique may be any one of spread spectrum color shift keying (SS-CSK) modulation, scalable color amplitude modulation (SCAM), and spread spectrum scalable color amplitude modulation (SS-SCAM).

SS-CSK modulation, SCAM, and SS-SCAM are efficient modulation methods for display-based VLC systems. SS-CSK modulation, SCAM, and SS-SCAM are asynchronous communication methods that have higher data rates and are more robust to error than existing methods, and are more robust to color interference than a single color.

FIG. 5 is a diagram illustrating an example of a process in which the transmission device 100 of FIG. 1 outputs a visible light signal through the display 140 by applying SS-CSK modulation to data to be transmitted.

CSK can improve a data rate by increasing the number of symbols per bit, and SS is robust to signal interference errors and has security against multi-user access.

SS-CSK modulation to which such SS and CSK modulation techniques are applied corresponds to an asynchronous communication method that has a higher data rate and is more robust to errors than existing methods. SS-CSK modulation can have a low error rate of about less than $10^{-6}$ bit error rate (BER) and a maximum data transmission rate of 96 Mbit/s.

According to such SS-CSK modulation, transmission data D can be modulated by using a bipolar conversion unit 510, a spreading code generation unit 520, a unipolar conversion unit 530, and a CSK modulation unit 540, passed through a color pattern generation unit 550 and a visual display frame generation unit 560, and then displayed in the transmission device 100.

FIG. 6 is a diagram illustrating an example of a process in which the transmission device 100 of FIG. 1 outputs a visible light signal by applying SCAM to data to be transmitted.

SCAM is a CSK-based modulation structure that is referred to as scalable color amplitude modulation for distance and angle improvement together with a high bit rate.

SCAM may be a modulation method for a display-based VLC system that has improved VLC throughput by increasing the number of symbols per bit. SCAM can have a low error rate of about less than $10^{-6}$ BER and a maximum data transmission rate of 240 Mbit/s.

According to such SCAM, transmission data D can be modulated through a SCAM unit 610, passed through a color pattern generation unit 620 and a visual display frame generation unit 630, and then displayed in the transmission device 100.

FIG. 7 is a diagram illustrating an example of a process in which the transmission device 100 of FIG. 1 outputs a visible light signal through the display 140 by applying SS-SCAM to data to be transmitted.

SS-SCAM is a CSK-based modulation structure that is referred to as scalable color amplitude modulation for distance and angle improvement together with a high bit rate. SS modulation is a technique that is advantageous for removing interference of an SS signal, and can be used together with SCAM to impart robustness to interference errors. SS-SCAM can have a low error rate of about less than $10^{-6}$ BER and a maximum data transmission rate of 240 Mbit/s.

According to such SS-SCAM, transmission data D can be modulated by using a bipolar conversion unit 710, a spreading code generation unit 720, a unipolar conversion unit 730, and a SCAM unit 740, passed through a color pattern generation unit 750 and a visual display frame generation unit 760, and then displayed in the transmission device 100.

Figure 8:
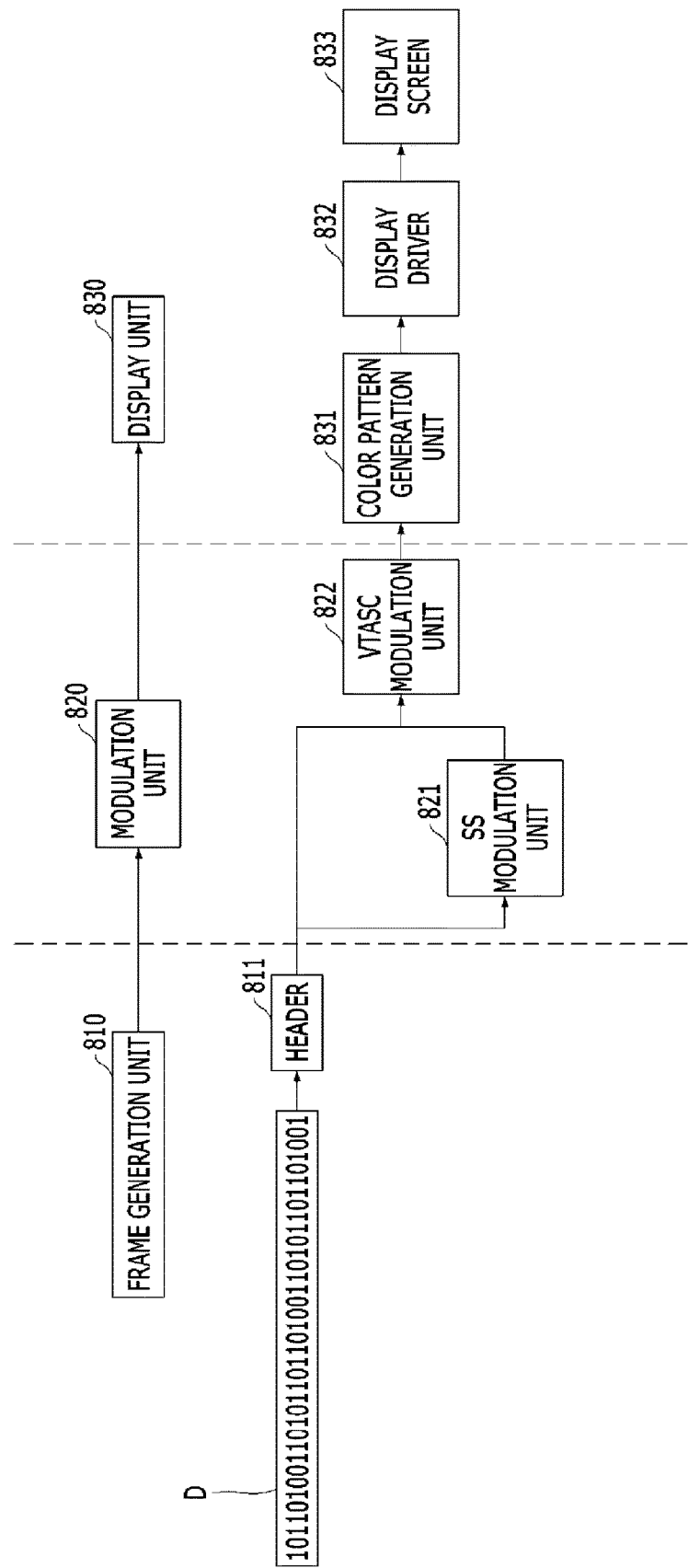
FIG. 8 is a diagram illustrating an example of a process in which the transmission device of FIG. 1 outputs a visible light signal through the display by applying variable transparent amplitude shape color (VTASC) modulation to data to be transmitted.
Figure 9:
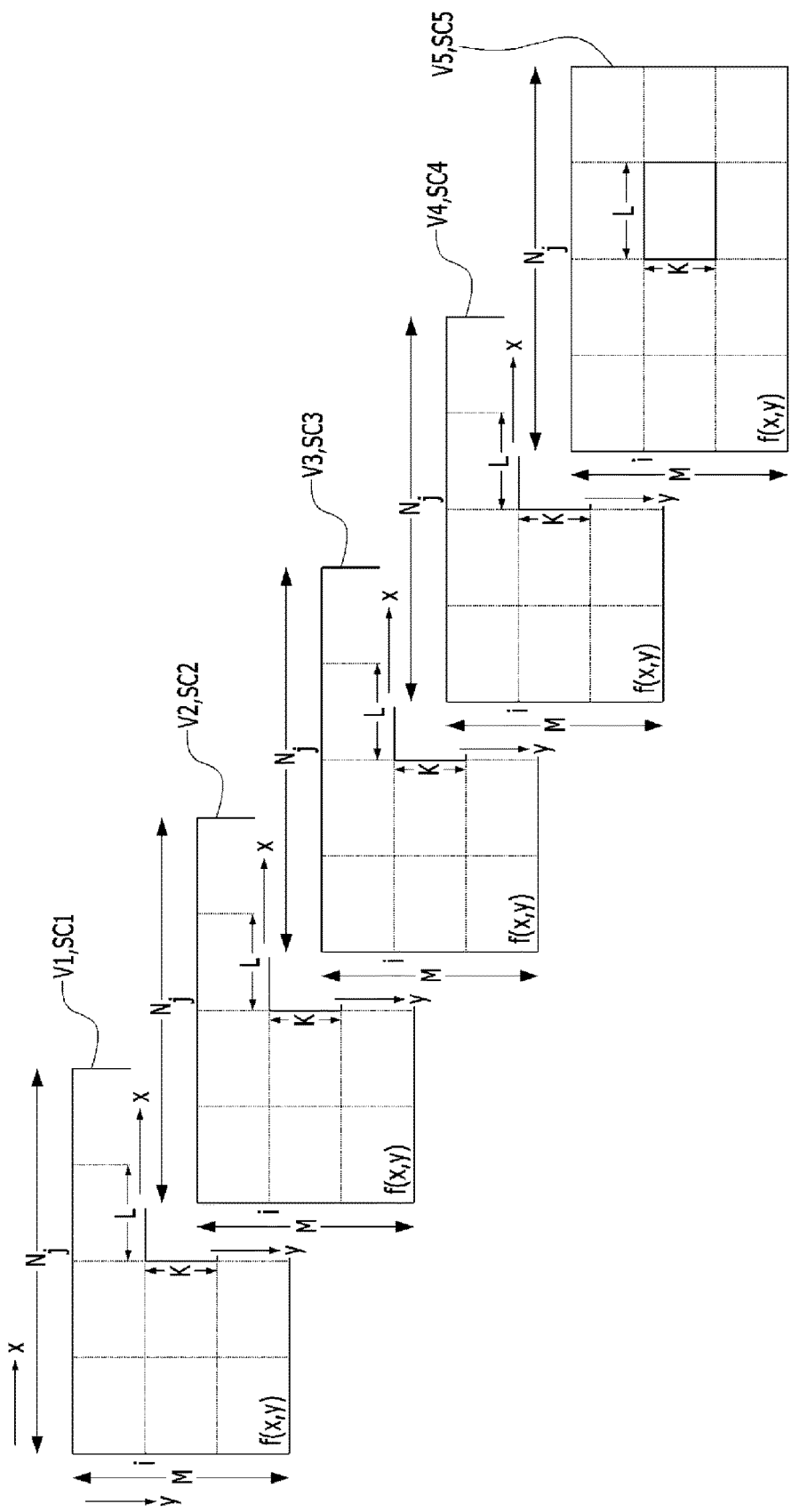
FIG. 9 is a diagram illustrating an asynchronous communication technique applied to VTASC modulation.
Figure 10:
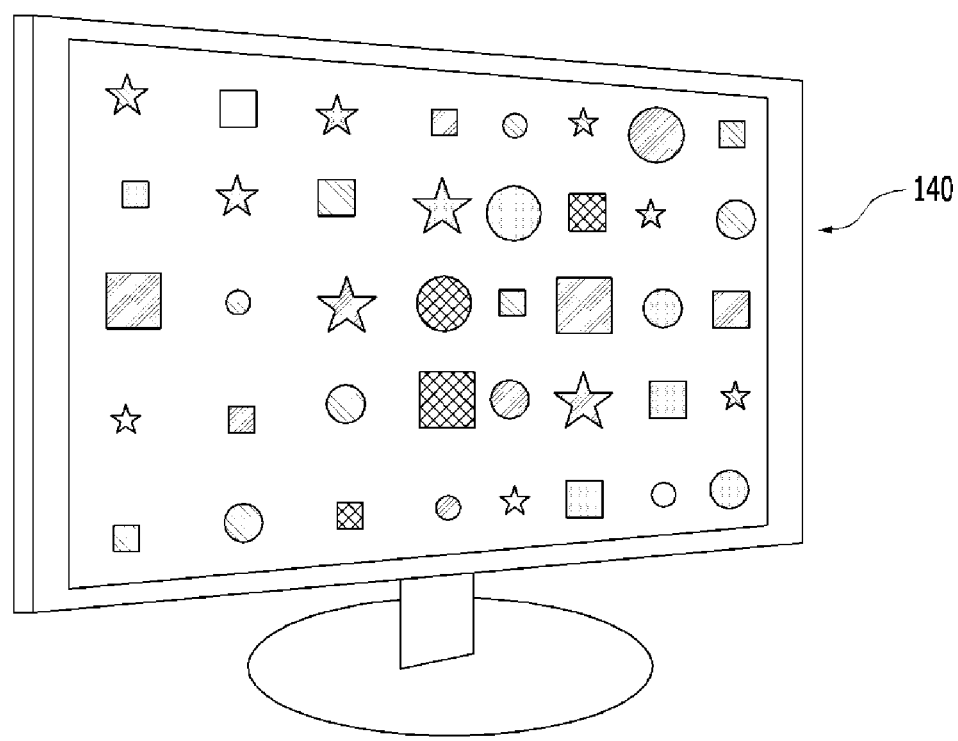
FIG. 10 is a diagram showing an example of a pattern output according to VTASC modulation.

FIG. 8 is a diagram illustrating an example of a process in which the transmission device 100 of FIG. 1 outputs a visible light signal through the display 140 by applying variable transparent amplitude shape color (VTASC) modulation to data to be transmitted. FIG. 9 is a diagram illustrating an asynchronous communication technique applied to VTASC modulation. FIG. 10 is a diagram showing an example of a pattern output according to VTASC modulation.

In the VLC method according to an embodiment of the present invention, it is possible to modulate transmission data through VTASC modulation as well as the through above-described modulation techniques.

VTASC modulation is expanded SCAM. While SCAM involves modulating transmission data with a scalable color and amplitude, VTASC involves modulating transmission data in consideration of transparency and shape in addition to a scalable color and amplitude.

According to such VTASC, transmission data D can be displayed in the transmission device 100 by using a frame generation unit 810, a modulation unit 820 for providing modulation techniques of SS 821 and VTASC 822, and a display unit 830 composed of a color pattern generation unit 831, a display driver 832, and a display screen 833.

VTASC applied to an embodiment of the present invention corresponds to an asynchronous communication method that has a high data rate and robust characteristics. In the case of an asynchronous communication method, different spreading codes can be used to transmit individual video frames as shown in FIG. 9. Here, each of spreading code sets SC1 to SC5 is expressed, according to a spreading factor thereof, as spreading data, and the spreading code sets SC1 to SC5 are consecutively assigned to five video frames V1 to V5 as shown in FIG. 9.

For automatic synchronization of received data, the reception device 200 can previously know the spreading codes SC1 to SC5.

When the reception device 200 receives identical frames through the camera 240, for example, when the reception device 200 receives the first video frame V1 twice, the reception device 200 can perform despreading by using the first and second spreading codes SC1 and SC2 used for the first video frame V1 and the second video frame V2. When a process employing the second spreading code SC2 proceeds, a dominant value is not revealed, such that the duplicate first frame V1 can be removed.

Meanwhile, an example of modes in which VTASC operates in the physical layer (PHY) can be represented as shown in Table 1 below.

TABLE 1

| PHY operating modes | | | | |
|---|---|---|---|---|
| Modulation (T × A × S × C) | Run-length limited (RLL) code | Optical clock rate | Forward error correction (FEC) | Data rate (Kbps) |
| 2 Color VTASC code[1] (T = 2, A = 2/4/8, S = 2/4, C = 2) | None | 30 Hz | R2(64, 32)/ RS(160, 128)/ None | 390 Kbps |
| 4 Color VTASC code[1] (T = 2, A = 2/4/8, S = 2/4, C = 4) | None | 30 Hz | R2(64, 32)/ RS(160, 128)/ None | 450 Kbps |
| 8 Color VTASC code[1] (T = 2, A = 2/4/8, S = 2/4, C = 8) | None | 30 Hz | R2(64, 32)/ RS(160, 128)/ None | 506 Kbps |

TABLE 1-continued

PHY operating modes

| Modulation (T × A × S × C) | Run-length limited (RLL) code | Optical clock rate | Forward error correction (FEC) | Data rate (Kbps) |
|---|---|---|---|---|
| 16 Color VTASC code[2] (T = 2, A = 2/4/8, S = 2/4, C = 16) | None | 30 Hz | R2(64, 32)/ RS(160, 128)/ None | 1054 Kbps |
| 2 Color SS VTASC code[1] (T = 2, A = 2/4/8, S = 2/4, C = 2) | None | 30 Hz | None | 195 Kbps |
| 4 Color SS VTASC code[1] (T = 2, A = 2/4/8, S = 2/4, C = 4) | None | 30 Hz | None | 225 Kbps |
| 8 Color SS VTASC code[1] (T = 2, A = 2/4/8, S = 2/4, C = 8) | None | 30 Hz | None | 253 Kbps |
| 16 Color SS VTASC code[2] (T = 2, A = 2/4/8, S = 2/4, C = 16) | None | 30 Hz | None | 527 Kbps |

[1][32 × 32 block size],
[2][24 × 24 block size]

Here, T denotes transparency, A denotes amplitude, S denotes shape, and C denotes color.

Reed-Solomon (RS) and FEC rates are as shown in Table 2 below.

TABLE 2

| Sequence | RS | FEC rate |
|---|---|---|
| 1 | None | 1 |
| 2 | RS (64, 32) | 32/64 |
| 3 | RS (160, 128) | 128/160 |

VTASC modulation enables various combinations of transparency, amplitude, shape, and color and thus can provide a high data transmission rate.

For example, when V=2, A=4, S=4, and C=8, 2×4×4×8=256=$2^8$ combinations are available, and 8-bit symbols can be provided by the combinations.

According to such VTASC modulation, as shown in FIG. 10, the transmission device 100 can modulate transmission data into a combination of various transparencies, amplitudes, shapes, and colors and transmit the modulated transmission data through the display 140 by using VLC.

Here, a transparency involves a transparency value of an original color displayed by one pixel in the display 140 of the transmission device 100. In other words, a large amount of various types of data are transmitted through color that includes transparency values. The transparency can be changed by adding a transparency value to at least one of a red value, a green value, and a blue value corresponding to the original color.

For example, the transparency may be changed by adding the transparency value to all of the red value, the green value, and the blue value corresponding to the original color. In this case, it is preferable to change the transparency to be within a range that cannot be recognized by a human.

Also, a transparency value may be changed into the form of a sine wave at an arbitrary frequency, and in this case, the frequency of the transparency value can be selectively changed by the transmission device 100. In other words, the transmission device 100 can include transmission data in a visible light signal by changing the frequency of the transparency value, and can output the visible light signal.

Therefore, according to an embodiment of the present invention, it is possible to transmit a large amount of various types of data by adjusting a transparency value as well as a flicker of an original color.

Meanwhile, a media access control (MAC) layer frame structure of VTASC can be represented as shown in Table 3.

TABLE 3

| Octets | | | | | |
|---|---|---|---|---|---|
| 2 | 1 | 0/2/8 | 0/2/8 | Variable | 2 |
| Frame control | Sequence number | Destination address | Source address | Frame payload | Frame check sequence (FCS) |
| MAC header (MHR) | | Address fields | | MAC service data unit (MSDU) | MAC footer (MFR) |

In the MAC frame structure, a frame control field will be described first. The frame control field can be represented as shown in Table 4 below.

TABLE 4

| Bits: | | | | | | | |
|---|---|---|---|---|---|---|---|
| 0-1 | 2-5 | 6-8 | 9 | 10 | 11 | 12-13 | 14-15 |
| Frame version | Reserved | Frame type | Security enabled | Frame pending | ACK request | Reserved | Reserved |

Here, the frame version subfield is a field regarding a detailed version of a frame and can be set to "0b01" so as to be compatible with Institute of Electrical and Electronic Engineers (IEEE) 802.15.7r1. Values of all other subfields can be left for later use.

The frame type subfield is intended for a detailed frame type of the MAC frame and can be assigned one of non-reserved values in Table 5 below.

TABLE 5

| Frame type value ($b_2b_1b_0$) | Description |
|---|---|
| 000 | Beacon |
| 001 | Data |
| 010 | Acknowledgement |
| 011 | Command |
| 100-111 | Reserved |

The security enabled subfield relates to a determination of whether to activate security of a data frame during a transmission. The security enabled subfield has a length of one bit, and is set to 1 when the data frame is protected by a MAC sublayer and to 0 otherwise. Meanwhile, an auxiliary security header field of the MHR can appear only when the security enabled field is set to 1.

The frame pending subfield relates to a determination of whether to pend the data frame during the transmission. The frame pending subfield has a length of one bit, and is set to 1 when the transmission device 100 further has data to be transmitted and to 0 otherwise.

The ACK request subfield is specified according to whether an acknowledgement from the reception device 200 that receives data or a MAC command frame is requested. The ACK request subfield has a length of one bit, and is set to 1 when the reception device 200 transmits an ACK frame. When the ACK request subfield is set to 0, the reception device 200 transmits no ACK frame.

Next, the sequence number field has a length of one octet and is intended to identify a sequence of the frame. In the case of a beacon frame, the sequence number field may be specified as a beacon sequence number (BSN), and in the case of a data, acknowledgement, or MAC command frame, the sequence number field may be specified as a data sequence number (DSN).

Next, the destination address field has a length of two or eight octets and may have a value specified according to a destination addressing subfield of the frame control field and a reception address of the frame.

The destination address field that has a 16-bit value of 0xffff may be expressed as a short address for broadcasting that can be accepted as a short address of 16 valid bits by all devices waiting, through a current channel, for broadcasting.

Such a destination address field can be included in the MAC frame when the destination addressing subfield of the frame control field is not zero.

Next, the source address field has a length of two or eight octets and may have a value specified according to a source addressing subfield of the frame control field and an operator address of the frame.

Such a source address field can be included in the MAC frame only when the source addressing subfield of the frame control field is 10 or 11.

Next, the frame payload field can have various lengths and include information for specifying each individual frame type.

When the security enabled subfield of the frame control field is set to 1, the frame payload field can be protected as defined in a security suite selected for the corresponding frame.

Lastly, the FCS field has a length of two octets, and an FCS is calculated for the MHR and the MSDU of the frame. The FCS can be generated only when a payload is greater than 0.

The FCS is an optional field of the MAC frame, and field information of the FCS can be generated from RS(64, 32)/RS(160, 128)/None based on the payload and an FCS option used in the MAC frame.

Meanwhile, a MAC personal area network (PAN) information base (PIB) applied to an embodiment of the present invention includes attributes required to manage MAC sublayers of a device. The attributes are included in IEEE 802.15.7. Also, additional MAC PIB attributes added to two-dimensional (2D) codes are shown in Table 6 below.

TABLE 6

| | | MAC PIB attributes table 60 additions | | | |
|---|---|---|---|---|---|
| Attribute | Identifier | Type | Range | Detailed description | Initial value |
| macTxMode | 0 x 91 | Unsigned | 0-255 | This attribute indicates the MAC transmission mode is visible or invisible. 0: visible VTASC mode 1: visible sequential scalable 2D code 2: invisible mode-blending method 3: invisible mode-watermarking method | 0 |
| macTxCamerEnable | 0 x 92 | Unsigned | 0-255 | This attribute indicates the transmitter is enabled with camera or not for interactive receiver distance specific data transfer control. 0: not connected to camera 1: connected to camera | 0 |
| macRxDistance | 0 x 93 | Unsigned | 0-255 | This attribute notify the receiver distance from transmitter | 0 |
| macTxDataType | 0 x 94 | Unsigned | 0-255 | This attribute indicates the type of data to be transmitted. 0: general data (media content, information content based on the application used for) 1: ID data 2: authentication data | 0 |

TABLE 6-continued

MAC PIB attributes table 60 additions

| Attribute | Identifier | Type | Range | Detailed description | Initial value |
|---|---|---|---|---|---|
| macDataLength | 0 x 95 | Integer | 0-65535 | This attribute specify the length of the data to be transmitted | 0 |

With such VTASC modulation according to an embodiment of the present invention, it is possible to provide a larger number of data transmission rates than SCAM.

Also, VTASC modulation enables free VLC, without being limited by the angle and the distance between a transmission device and a reception device, as described below with reference to FIG. 20.

Figure 11:
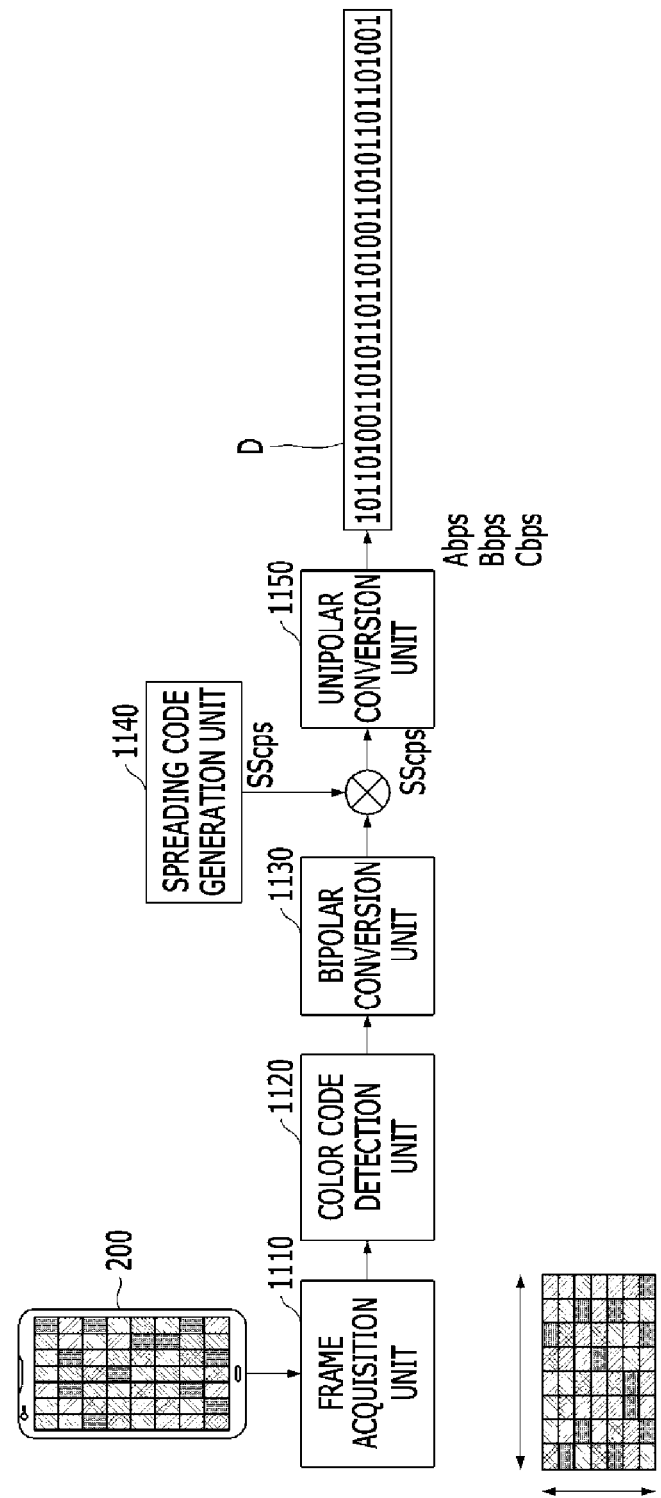
FIG. 11 is a diagram illustrating an example of a process in which a reception device of FIG. 1 receives a visible light signal and extracts data.

FIG. 11 is a diagram illustrating an example of a process in which the reception device 200 of FIG. 1 receives a visible light signal and extracts data.

The reception device 200 can receive a visible light signal through the camera 240 and extract modulated data. Then, the reception device 200 can change the modulated data into transmission data by using a demodulation method corresponding to a communication modulation technique.

For example, as shown in FIG. 11, when a visible light signal is received through the camera 240, decoded transmission data D can be acquired by using a frame acquisition unit 1110, a color code detection unit 1120, a bipolar conversion unit 1130, a spreading code generation unit 1140, and a unipolar conversion unit 1150.

Here, the demodulation method corresponding to the communication modulation technique may be any one of SS-CSK demodulation, SCAM demodulation, SS-SCAM demodulation, and VTASC demodulation.

Figure 12:
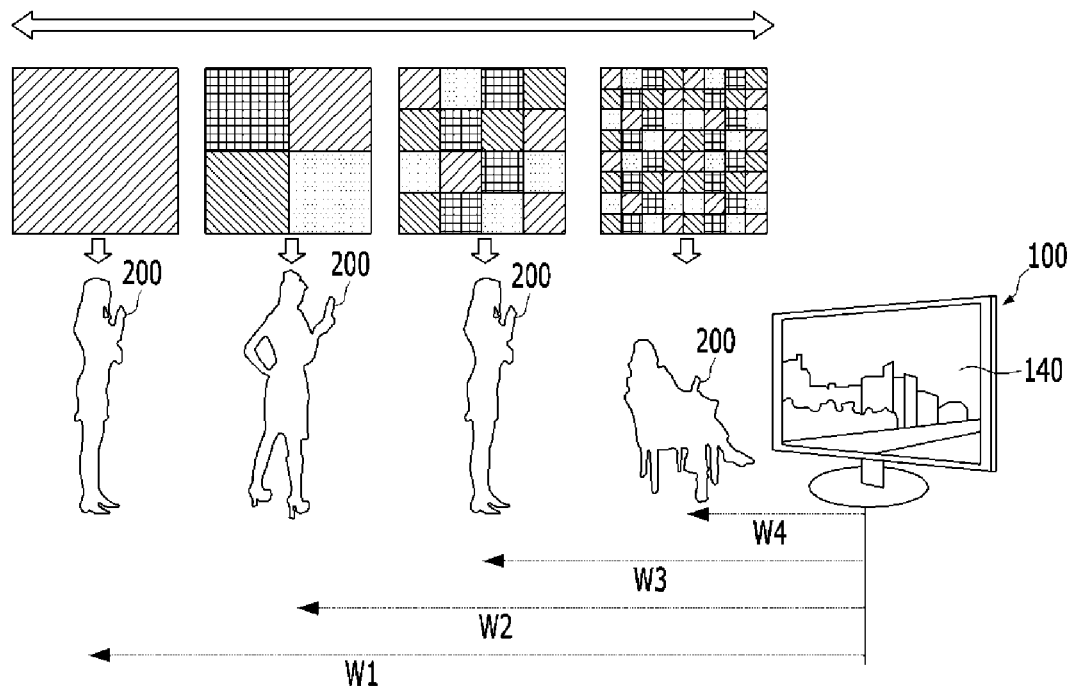
FIG. 12 is a diagram showing an example in which the transmission device of FIG. 1 senses a distance from the reception device and the number of displayed regions is changed according to the distance.

FIG. 12 is a diagram showing an example in which the transmission device 100 of FIG. 1 senses a distance from the reception device 200 and the number of displayed regions is changed according to the distance.

Referring to FIG. 12, to divide the screen of the display 140 into a plurality of regions, the transmission device 100 can sense the distance from the reception device 200 first.

To this end, the transmission device 100 can include therein a detection sensor (not shown) for measuring the distance from the reception device 200, such as a camera, an ultrasonic detection sensor, a range finder, a radio wave detection sensor, a microwave detection sensor, an infrared detection sensor, etc., and can sense the distance from the reception device 200 by using the detection sensor.

Subsequently, the transmission device 100 can divide modulated data so that pieces of the divided modulated data correspond to regions, the number of regions being determined according to the distance.

For example, as shown in FIG. 12, when the distance exceeds a first reference distance w1, the transmission device 100 can transmit data by using the screen of the display 140 as one region and changing color.

On the other hand, when the distance is the first reference distance w1 or less and exceeds a second reference distance w2, the transmission device 100 can transmit data by dividing the screen of the display 140 into four regions 2×2 and changing color.

Also, when the distance is the second reference distance w2 or less and exceeds a third reference distance w3, the transmission device 100 can transmit data by dividing the screen of the display 140 into 16 regions 4×4 and changing color.

Further, when the distance is the third reference distance w3 or less and exceeds a fourth reference distance w4, the transmission device 100 can transmit data by dividing the screen of the display 140 into 64 regions 8×8 and changing color.

As described above, when the distance decreases, the transmission device 100 can transmit data by dividing the screen of the display 140 into smaller regions and changing color. Such division of the screen according to the distance can be set and stored in advance to an optimal number of regions based on a data transmission rate.

Meanwhile, when the transmission device 100 transmits data by dividing the screen of the display 140 into a relatively small number of regions (e.g., one region, four regions, etc.) and changing color, it is possible to increase a transmission rate by adding a change in flickering.

Examples of transmitting data by using various colors and patterns will be described below with reference to FIGS. 13 to 16.

Figure 13:
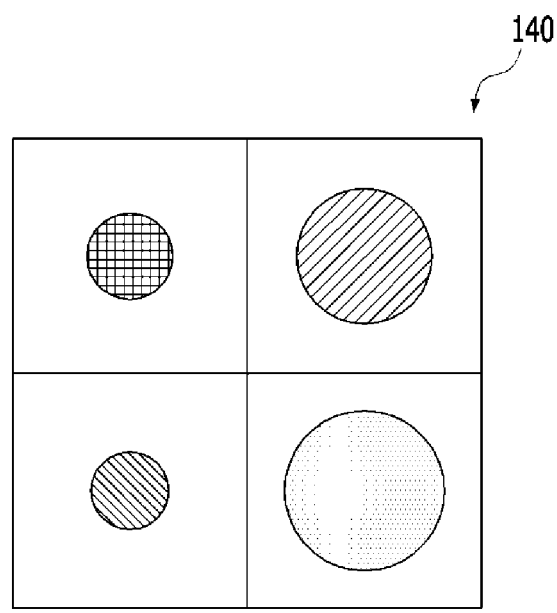
FIG. 13 is an example of transmitting data by using the size and change in color of a pattern displayed in the transmission device of FIG. 1.
Figure 14:
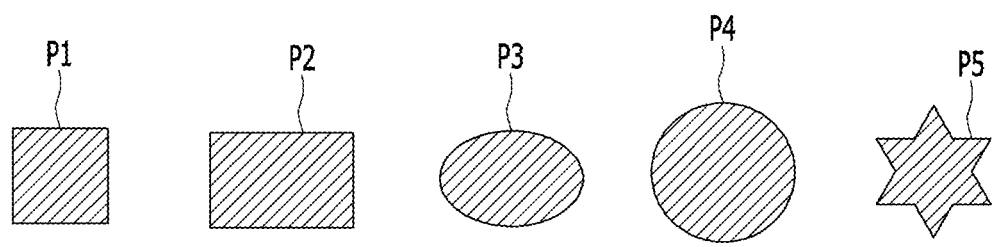
FIG. 14 is a diagram showing examples illustrating other shapes of the pattern of FIG. 13.
Figure 15:
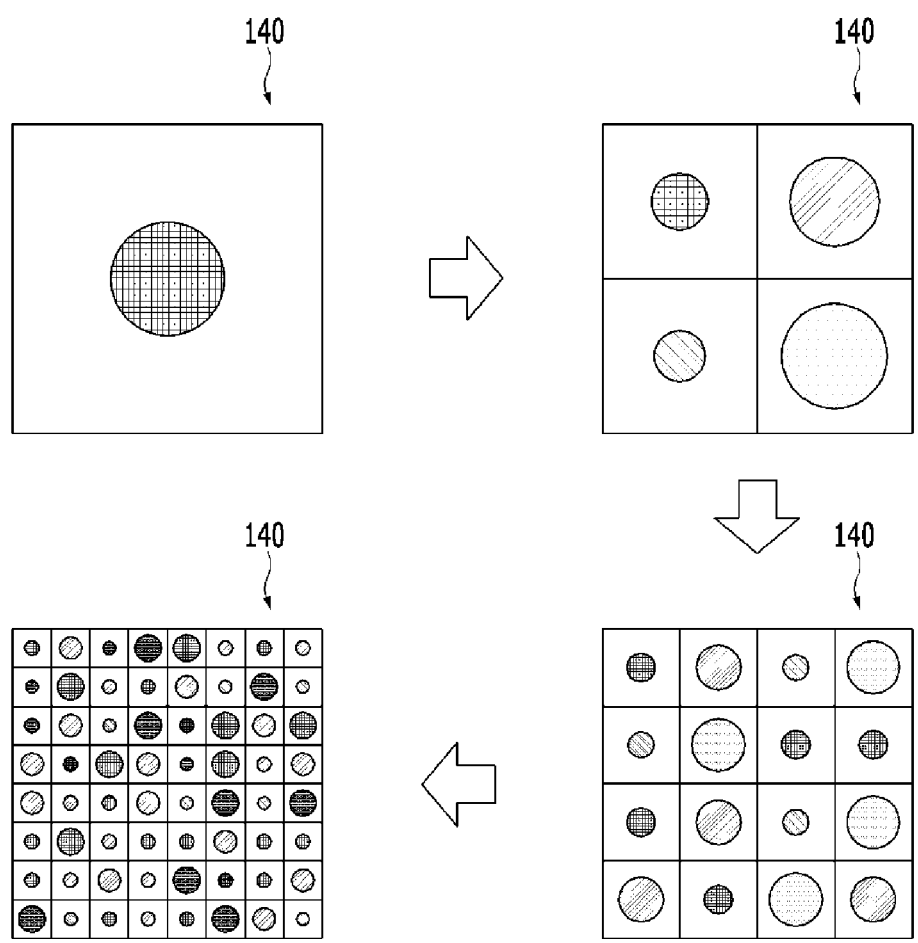
FIG. 15 is a diagram showing examples of the pattern of FIG. 13 displayed according to the size of the pattern and the distance between a transmission device and a reception device.
Figure 16A:
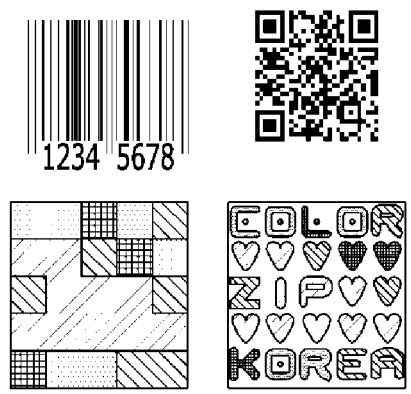
FIG. 16A to FIG. 16C are diagram illustrating examples of sequential scalable two-dimensional (2D) codes.
Figure 16B:
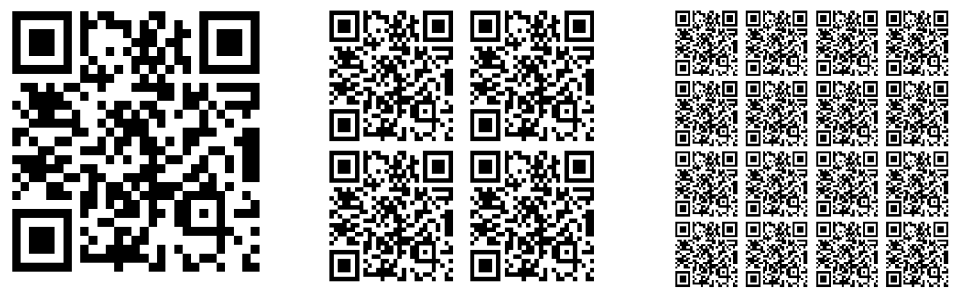
Figure 16C:
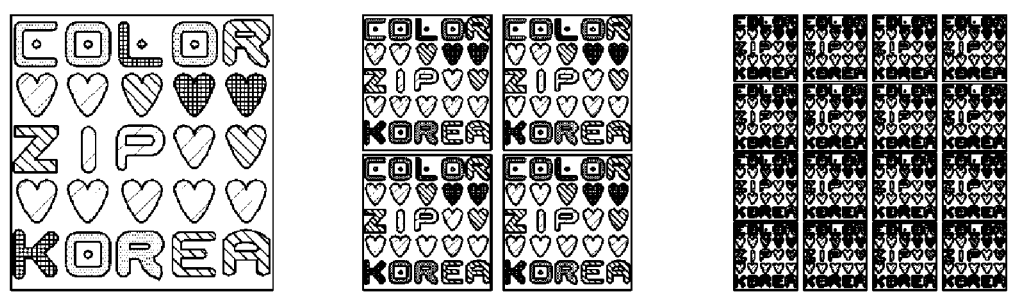

FIG. 13 is an example of transmitting data by using the size and change in color of a pattern displayed in the transmission device 100 of FIG. 1. FIG. 14 is a diagram showing examples illustrating other shapes of the pattern of FIG. 13. FIG. 15 is a diagram showing examples of the pattern of FIG. 13 displayed according to the size of the pattern and the distance between the transmission device 100 and the reception device 200. FIG. 16A to FIG. 16C are diagram illustrating examples of sequential scalable 2D codes.

Referring to FIGS. 13 to 16, when the transmission device 100 outputs a visible light signal by using a pattern during the process of including modulated data in the visible light signal and outputting the visible light signal through the display 140, it is possible to include the modulated data in the visible light signal by using the color and the size of the pattern and output the visible light signal through the display 140.

For example, as shown in FIG. 13, the transmission device 100 transmits data by dividing the screen of the display 140 and changing the size of a circle as well as the color of the circle such that a data transmission rate can be improved.

For example, as shown in FIG. 13, the transmission device 100 can transmit data by changing the sizes of the colors of circles in divided regions.

As shown in FIG. 14, such a pattern can be have various shapes such as a square P1, a rectangle P2, ellipses P3 and P4, a star P5, a triangle, etc., other than a circle.

Referring to FIG. 15, such a pattern can be displayed in each of divided regions in the screen of the display 140. When the distance between the transmission device 100 and the reception device 200 is reduced, the number of divided regions increases. Therefore, the number of patterns that can be simultaneously displayed increases, and a data transmission rate can be further increased.

Also, according to an embodiment of the present invention, the color and the size of a pattern can be used to transmit data by using a sequential scalable 2D code.

As shown in FIG. 16A, a 2D code is intended for the display 140 based on a VLC system and is a graphic image (e.g., a barcode, a color code, a quick response (QR) code, etc.) that stores information in both a horizontal direction and a vertical direction.

According to an embodiment of the present invention, it is possible to provide a high bit transmission rate together with distance and angular freedom by using such a sequential scalable 2D code.

A sequential scalable 2D code can be configured on the display 140 as a QR code or color code whose data is encoded together with a visible frame, or a combination thereof.

A sequential scalable 2D code is a promised modulation technique for a display based on a VLC system that makes it possible to have high VLC performance by increasing a transmission rate (symbols per bit) and reducing color interference.

According to an embodiment of the present invention, as described with reference to FIG. 12, the transmission device 100 can sense the distance from the reception device 200, divide a sequential scalable 2D code to adaptively have an optimal transmission rate according to the distance, and output the divided sequential scalable 2D codes.

For example, as shown in FIG. 16B and FIG. 16C, when the distance from the reception device 200 exceeds the first reference distance w1, the transmission device 100 can transmit a QR code or a color code by using the whole region, and when the distance is the first reference distance w1 or less but exceeds the second reference distance w2, the transmission device 100 can divide the whole region into four regions and then transmit a QR code or a color code by using the regions.

Although each of FIG. 16B and FIG. 16C shows that only a QR code or only a color code is applied, a QR code and a color code may be combined in the case of long-distance transmission and reception, for which the screen is divided into a plurality of regions so that various types of transmission data can be transmitted and received.

Figure 17A:
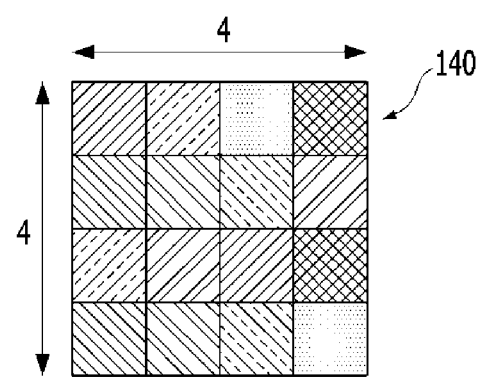
FIG. 17A and FIG. 17B are diagram illustrating a change in the arrangement of regions according to the size and the shape of the display screen of the transmission device of FIG. 1.
Figure 17B:
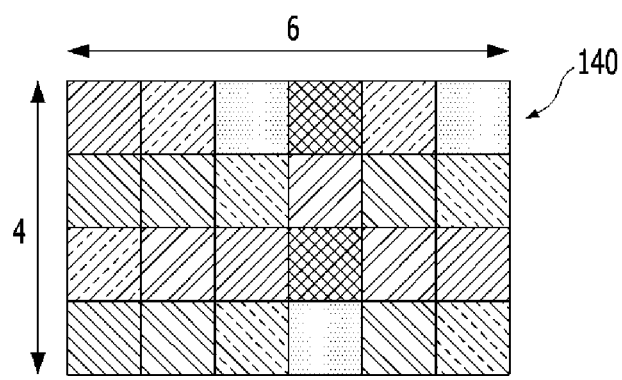

FIG. 17A and FIG. 17B are diagram illustrating a change in the arrangement of regions according to the size and the shape of the screen of the display 140 of the transmission device 100 of FIG. 1.

Referring to FIG. 17A and FIG. 17B, during a process in which the transmission device 100 divides the screen of the display 140 into a plurality of regions, the number and the arrangement of divided regions can be determined according to the size and the shape of the screen of the display 140.

For example, when the display 140 is a general display FIG. 17A, 16 regions are arranged in four rows by four columns, but when the display 140 is a wide display FIG. 17B, 24 regions can be arranged in four rows by six columns.

In other words, when a horizontal or vertical size increases, the number of regions can be increased by as much as the increased size.

Figure 18:
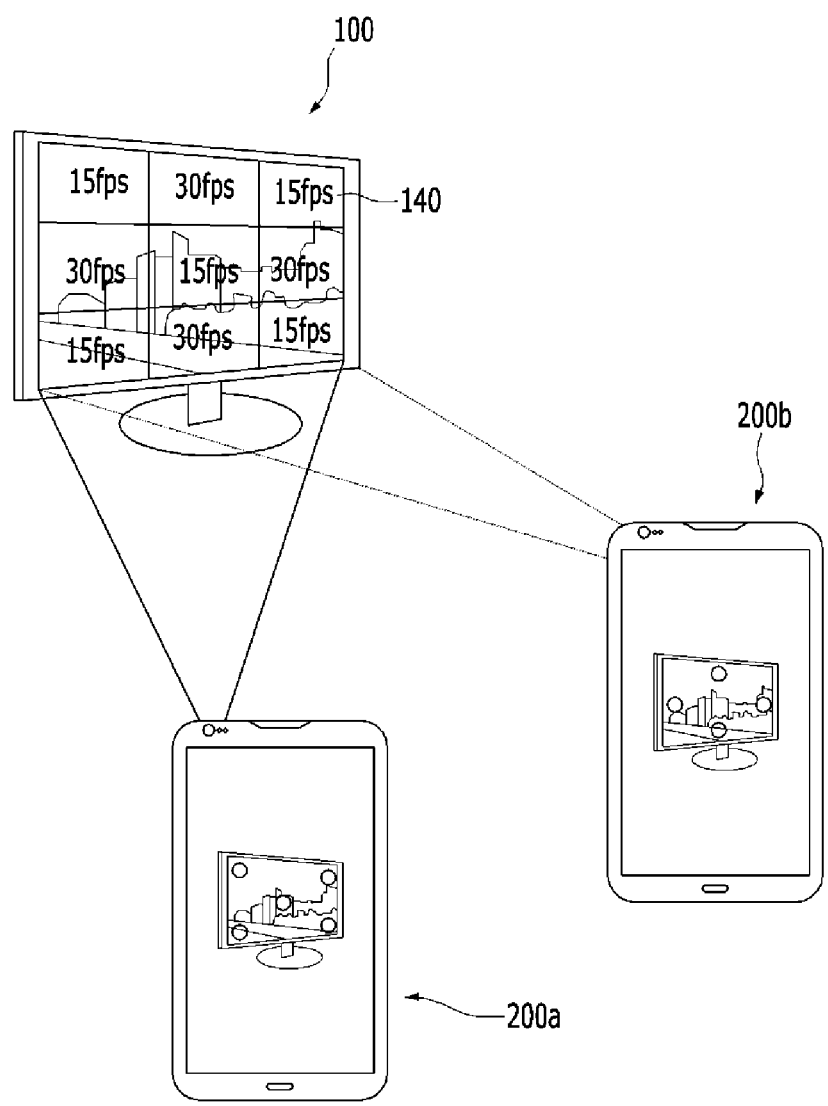
FIG. 18 is a diagram showing an example in which the transmission device of FIG. 1 transmits a visible light signal at a plurality of frame rates (frames per second (fps)).

FIG. 18 is a diagram showing an example in which the transmission device 100 of FIG. 1 transmits a visible light signal at a plurality of frame rates (frames per second (fps)).

Referring to FIG. 18, during a process in which the transmission device 100 includes modulated data in a visible light signal and outputs the visible light signal through the display 140, the transmission device 100 can divide the visible light signal according to a plurality of frame rates (fps) and output the divided visible light signals.

For example, as shown in FIG. 18, the transmission device 100 can classify regions of the display 140 into two types of regions having rates of 15 fps and 30 fps, and output images at different frame rates (fps).

Accordingly, the reception device 200 can selectively receive the visible light signals according to performance thereof. For example, a smart phone 200a with relatively low performance can receive only regions corresponding to 15 fps, and a smart phone 200b with high performance can only receive regions corresponding to 30 fps or in some cases receive all regions corresponding to both 15 fps and 30 fps.

Figure 19:
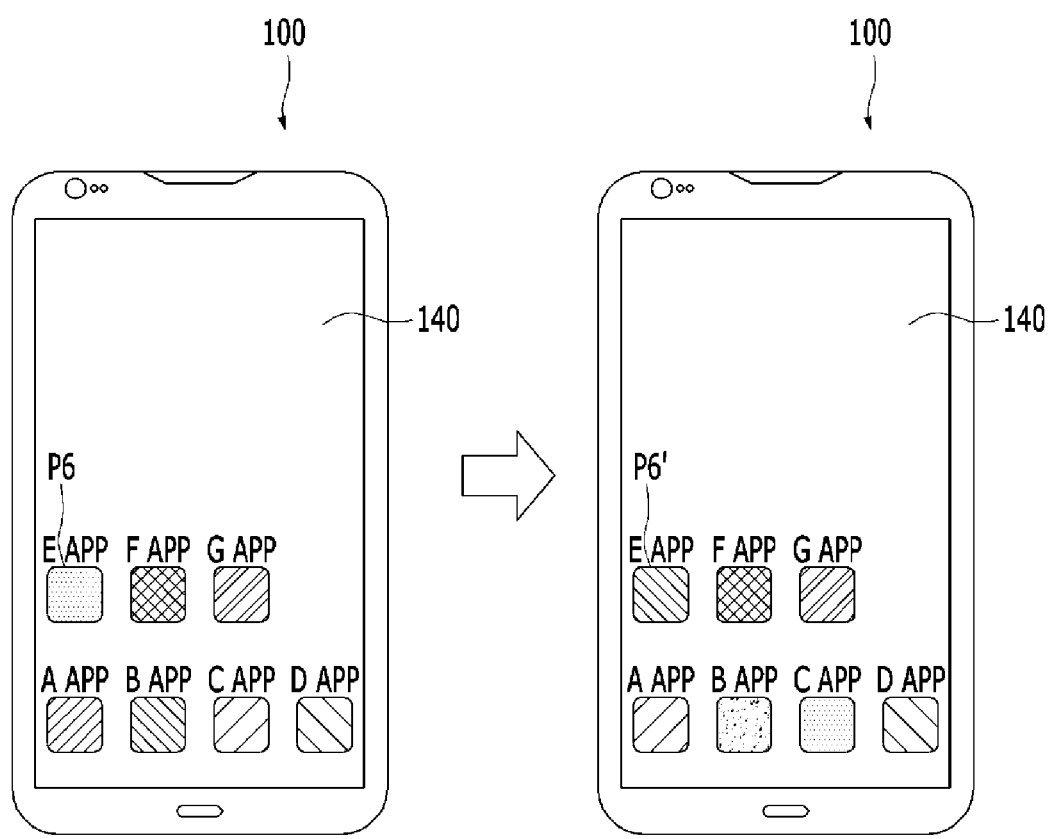
FIG. 19 is a diagram showing an example of transmitting data by using a change in the color of an app icon displayed in the transmission device of FIG. 1.

FIG. 19 is a diagram showing an example of transmitting data by using a change in the color of an app icon displayed in the transmission device 100 of FIG. 1.

Referring to FIG. 19, during a process in which the transmission device 100 includes modulated data in a visible light signal and outputs the visible light signal through the display 140, the transmission device 100 can include the modulated data in the visible light signal by using colors of app icons and output the visible light signal through the display 140.

For example, when the transmission device 100 is a smart phone or a tablet PC, it is possible to transmit data to be transmitted by changing a color P6 of an app icon displayed in the display 140 to another color P6'. In some cases, it is possible to transmit a larger amount of data by adjusting the shape, the number of flickers per second, and the like of an app icon together with the color.

Figure 20:
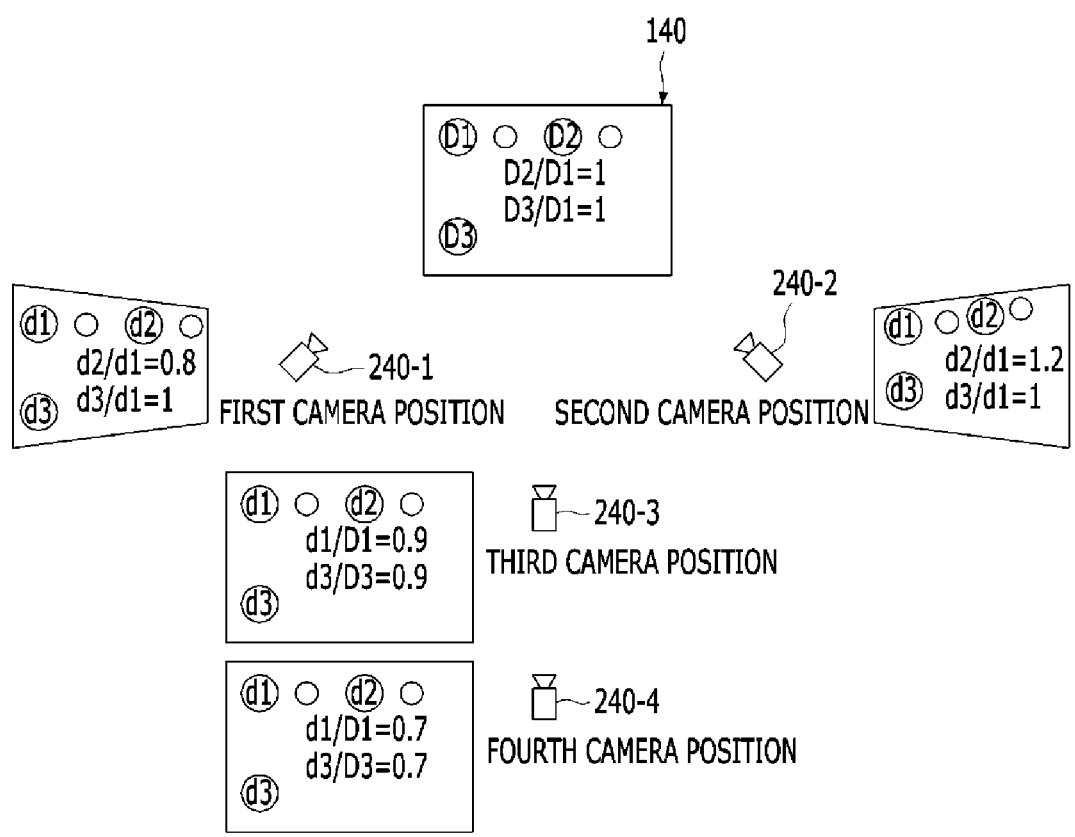
FIG. 20 is an exemplary diagram illustrating a communication process between a display having angular freedom and a camera.

FIG. 20 is an exemplary diagram illustrating a communication process between the display 140 having angular freedom and the camera 240.

Referring to FIG. 20, a VLC method according to an embodiment of the present invention makes it possible to receive a visible light signal output from the transmission device 100 and easily extract transmission data regardless of a position at which the reception device 200 captures an image.

For example, when a ratio of a second pattern D2 output on the display 140 to a first pattern D1 output on the display 140 is 1 and a ratio of a second pattern d2, which is photographed by a camera 240-1 of the reception device 200 at a first camera position whose angle with respect to the display 140 faces a lateral direction rather a forward direction, to a first pattern d1, which is photographed by the camera 240-1 at the first camera position, is 0.8, the reception device 200 can correct the ratio of the second pattern d2 to the first pattern d1 to 1 according to a distortion correction algorithm.

Also, the transmission device 100 can estimate the positions of cameras 240-3 and 240-4 of the reception device 200 based on the sizes and the positions of a pattern photographed by the cameras 240-3 and 240-4 of the reception device 200. In this case, it is necessary to know in advance the size of the pattern corresponding to transmission data, and a straight line passing through the center of the pattern is required to be perpendicular to the positions of the cameras 240-3 and 240-4.

Figure 21:
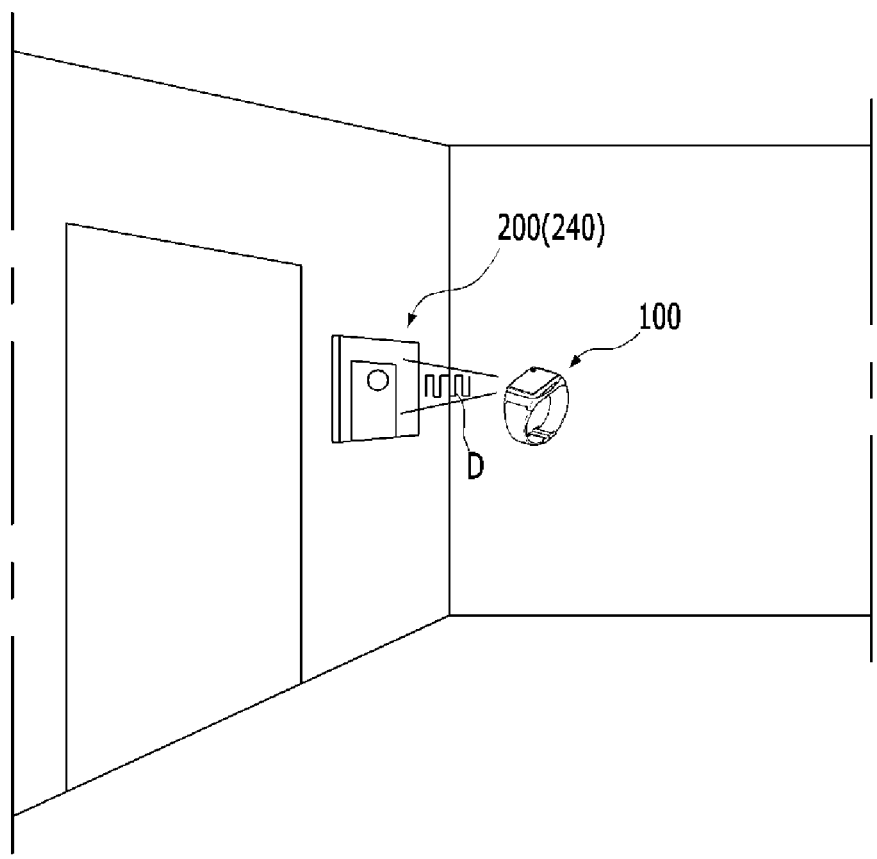
FIG. 21 is a diagram showing an example of performing entry authentication with a color/pattern combination displayed in the transmission device of FIG. 1.

FIG. 21 is a diagram showing an example of performing entry authentication with a color/pattern combination displayed in the transmission device 100 of FIG. 1.

Referring to FIG. 21, when the reception device 200 implemented as a door lock or the like performs entry authentication with a color/pattern combination displayed in a smart watch that is the transmission device 100, transmission data D is the same, but the combination displayed varies every time. Also, unlike a radio frequency (RF) signal, the transmission data D is received through the camera 240 of the reception device 200 without any signal being emitted from the surroundings. Therefore, security can be further improved.

Also, in the case of a smart watch, a function of allowing only operation by a registered user may be provided by using a biometric pattern such as a skin pattern, a pulse, or the like of the user. When the smart watch is used together with the above entry authentication technique, it is possible to expect heightened security.

Such entry authentication can be implemented not only by a smart watch but also by a smart phone, a smart pad, and the like.

According to such entry authentication, when the reception device 200 is implemented as a closed circuit (CC) camera, the transmission device 100 transmits transmission data according to pattern and color by using VLC, and the reception device 200 can authenticate a user through the transmission data.

Also, such entry authentication can be applied to and implemented in various fields such as authentication systems for vehicle control, intercoms for houses and companies, etc.

According to any one of the above-described embodiments of the present invention, since the transmission device 100 includes data to be transmitted in a visible light signal by using at least one of a color and a pattern of the display 140 and transmits the visible light signal to the reception device 200, the transmission device 100 can rapidly transmit a large amount of data.

In particular, both the color and the size of the pattern are used or the screen of the display 140 is divided into a plurality of regions to transmit a visible light signal, or patterns and colors of a plurality of displays of identical or different device types are used to perform visible light transmission such that the transmission device 100 can rapidly transmit a large amount of data.

Also, when a user has the reception device 200 including the camera 240, for example, a smart phone, a smart pad, a smart watch, or the like, the reception device 200 can be used as is to perform VLC. Therefore, the user can easily use VLC without purchasing a VLC receiver.

Meanwhile, the VLC communication method according to an embodiment of the present invention can be implemented as a computer program stored in a medium executed by a computer or in the form of a recording medium including a command executable by a computer. The computer-readable medium may be an arbitrary available medium that can be accessed by a computer and may include all of volatile and non-volatile media, and separable and inseparable media. The computer-readable medium may also include all of a computer storage medium and a communication medium. The computer storage medium includes all of volatile and non-volatile media, and separable and inseparable media that are embodied according to an arbitrary method or technology for storing information such as a command, a data structure, a program module, or other data that can be read by a computer. The communication medium typically includes a computer-readable command, a data structure, a program module, other data of a modulated data signal such as carrier waves, or other transmission mechanisms, and includes an arbitrary information transmission medium.

Although the method and the system of the present invention have been described in relation to particular embodiments, some or all of components or operations thereof can be implemented by a computer system having a general-use hardware architecture.

The above description of the present invention is exemplary, and those two or ordinary skill in the art will appreciate that the present invention can be easily carried out in other detailed forms without changing the technical spirit or essential characteristics of the present invention. Therefore, it should be noted that the embodiments described above are exemplary in all aspects and are not restrictive. For example, each component described to be a single type can be implemented in a distributed manner. Likewise, components described to be distributed can be implemented in a combined form.

It is noted that the scope of the present invention is defined by the following claims rather than the detailed description of the present invention, and the meanings and ranges of the claims and all modifications derived from the concept of equivalents fall within the scope of the present invention.

LIST OF REFERENCE SIGNS

100: transmission device
200: reception device
110, 210: communication module
120, 220: memory
130, 230: processor
140: display
240: camera

The invention claimed is:

1. A visible light communication (VLC) method in which a transmission device having a display transmits a signal to a reception device having a camera, the method comprising:
    modulating, by the transmission device, individual video frames of transmission data into modulated data by using different spreading codes according to variable transparent amplitude shape color (VTASC) modulation; and
    including, by the transmission device, the modulated data in a visible light signal by using at least one of a color and a pattern, and outputting the visible light signal through the display; and
    receiving, by the reception device, the visible light signal through the camera, and extracting the transmission data.

2. The VLC method of claim 1, wherein the modulating further comprises modulating, by the transmission device, the transmission data by using a communication modulation technique that is any one of spread spectrum color shift keying (SS-CSK) modulation, scalable color amplitude modulation (SCAM), and spread spectrum scalable color amplitude modulation (SS-SCAM).

3. The VLC method of claim 1, wherein the extracting of the transmission data comprises:
    receiving, by the reception device, the visible light signal through the camera, and extracting the modulated data; and
    changing, by the reception device, the modulated data into the transmission data by using a demodulation method corresponding to the VTASC modulation.

4. The VLC method of claim 3, wherein the changing of the modulated data into the transmission data comprises extracting the modulated data by using a spreading code previously stored in the reception device.

5. The VLC method of claim 4, wherein when the reception device receives an identical video frame a plurality of times, the reception device removes duplicate video frames according to a despreading demodulation technique in which spreading codes applied to the identical video frame received the plurality of times and a subsequently received video frame are used.

6. The VLC method of claim 3, wherein the receiving of the visible light signal through the camera and the extracting of the modulated data by the reception device comprise, when an angle between the transmission device and the reception device does not face a forward direction, restoring the modulated data of the transmission device according to a distortion correction algorithm and extracting the modulated data.

7. The VLC method of claim 3, wherein the receiving of the visible light signal through the camera and the extracting of the modulated data by the reception device comprises, when a distance between the transmission device and the reception device is a preset distance or more, calculating the distance from the transmission device based on a size of the pattern of the transmission data, restoring the transmission data based on the calculated distance, and extracting the modulated data.

8. The VLC method of claim 1, wherein the including of the modulated data in the visible light signal and the outputting of the visible light signal through the display comprise dividing, by the transmission device, the visible light signal according to a plurality of frame rates (frames per second (fps)), and outputting divided visible light signals.

9. The VLC method of claim 1, wherein the including of the modulated data in the visible light signal and the outputting of the visible light signal through the display comprise including, by the transmission device, the modulated data in the visible light signal by using a color of an app icon, and outputting the visible light signal through the display.

10. The VLC method of claim 1, wherein the transmission device is any one of a smart phone, a smart watch, a tablet personal computer (PC), a monitor, a television (TV), and an electronic board, and
the reception device is any one of a smart phone, a smart watch, a smart pad, and a tablet PC.

11. A visible light communication (VLC) method in which a transmission device having a display transmits a signal to a reception device having a camera, the method comprising:
changing, by the transmission device, transmission data into modulated data by using a communication modulation technique;
dividing, by the transmission device, a screen of the display into a plurality of regions;
dividing, by the transmission device, the modulated data so that pieces of the divided modulated data correspond to the plurality of regions;
outputting, by the transmission device, divided visible light signals including the respective pieces of divided data through the respective plurality of regions by using the at least one of a color and a pattern; and
receiving, by the reception device, the divided visible light signals through the camera, and extracting the transmission data.

12. The VLC method of claim 11, wherein the dividing of the screen of the display into the plurality of regions by the transmission device comprises:
sensing, by the transmission device, a distance from the reception device; and
dividing, by the transmission device, the modulated data so that pieces of the divided data correspond to plurality of regions, a number of the plurality of regions being determined according to the distance.

13. The VLC method of claim 11, wherein the dividing of the screen of the display into the plurality of regions by the transmission device comprises determining a number and an arrangement of the divided plurality of regions according to a size and a shape of the screen of the display.

14. A visible light communication (VLC) method in which a transmission device having a display transmits a signal to a reception device having a camera, the method comprising:
changing, by the transmission device, transmission data into modulated data by using a communication modulation technique;
including, by the transmission device, the modulated data in a visible light signal by using a color and a size of a pattern, and outputting the visible light signal by using the pattern through the display; and
receiving, by the reception device, the visible light signal through the camera, and extracting the transmission data.

15. The VLC method of claim 14, wherein the pattern has any one shape among a circle, a square, a rectangle, an ellipse, a triangle, and a star.

16. The VLC method of claim 14, wherein the pattern is a sequential scalable two-dimensional (2D) code, and
the sequential scalable 2D code is implemented as at least one of a quick response (QR) code and a color code.

17. The VLC method of claim 16, wherein the including of the modulated data in the visible light signal and the outputting of the visible light signal through the display comprise:
sensing, by the transmission device, a distance from the reception device;
dividing, by the transmission device, a screen of the display into a plurality of regions so that the modulated data correspond to the plurality of regions, a number of the plurality of regions being determined according to the distance;
dividing, by the transmission device, the modulated data so that pieces of the divided modulated data correspond to the plurality of regions; and
outputting, by the transmission device, divided visible light signals including the respective pieces of divided data through the respective plurality of regions by using the at least one of the color and the pattern.

* * * * *